Nov. 9, 1971          H. KÖRNER          3,618,422
ROLLER WORM GEAR ARRANGEMENTS
Filed March 30, 1970
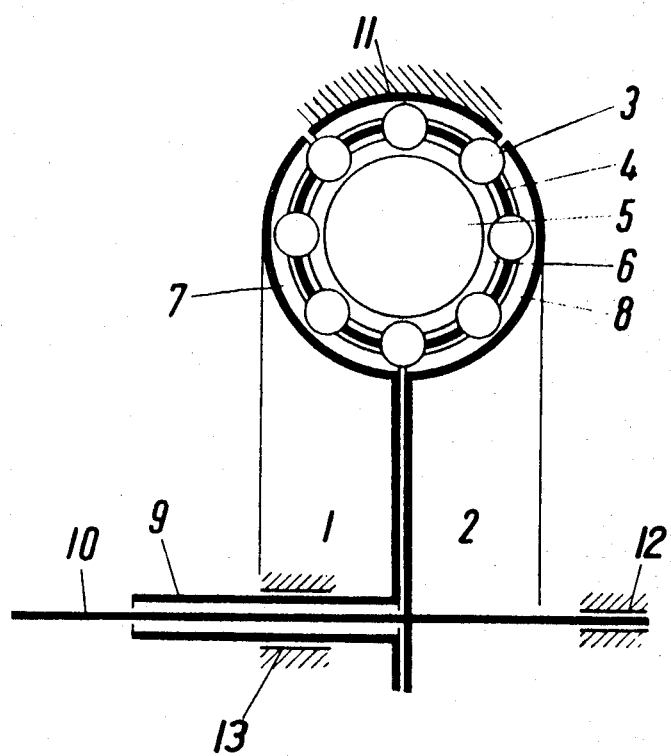
HELMUT KÖRNER
INVENTOR
BY: NOLTE + NOLTE
ATTORNEYS

United States Patent Office 3,618,422
Patented Nov. 9, 1971

3,618,422
ROLLER WORM GEAR ARRANGEMENTS
Helmut Körner, 12 Wichernstrasse,
D-3340 Wolfenbuttel, Germany
Filed Mar. 30, 1970, Ser. No. 29,327
Claims priority, application Germany, Apr. 2, 1969,
P 19 16 923.4
Int. Cl. F16h *1/16, 5/22, 37/06*
U.S. Cl. 74—665 GD
8 Claims

ABSTRACT OF THE DISCLOSURE

A roller worm gear arrangement is disclosed. The arrangement comprises a rotatable input shaft around the periphery of which a plurality of rotatable bodies are disposed in a carrier, the rotatable bodies are disposed at equal spacings and are in tangential contact with the periphery of the input shaft. The arrangement is provided with a plurality of co-axial output shafts, which are transversely orientated with respect to the input shaft and on each of which a respective helical gear wheel is mounted. Each helical gear wheel is mounted to rotate with the respective output shaft and is disposed in meshing relationship with the rotatable members carried on the carrier. The arrangement is such that in operation rotation of the input shaft causes the rotatable bodies to circulate in a planetary path thereby rotating each of the helical gear wheels and the respective output shafts.

BACKGROUND OF THE INVENTION

The present invention relates to improvements in a roller worm gear arrangement.

The suitability of known roller worm gear arrangements is generally restricted to simple changes in rotation speed in one stage with a comparatively low load-carrying capacity, on which limits are imposed by the prescribed small number of supporting ball, rollers or the like and the strength of the material at the contact points. With many known roller gear arrangements it is not possible to satisfy particularly high demands in regard to load-carrying capacity and in regard to adaptability of rotation speed conversion.

The problem therefore arises, whilst still retaining the other advantages of roller worm gear arrangements—such as the very favourable efficiency—of finding a basic construction of a roller worm gear with which it is also possible to meet more far-reaching requirements. It is especially desirable to provide a roller worm gear arrangement which provides a high load-carrying capacity whilst maintaining small constructional dimensions of the gear arrangement.

SUMMARY OF THE INVENTION

According to the present invention there is provided a roller worm gear arrangement comprising a rotatable input shaft, a carrier disposed concentrically of the input shaft and carrying a plurality of rotatable members at equal spacings around the periphery of the input shaft and in tangential contact therewith, a plurality of co-axial output shafts transversely orientated with respect to the input shaft and at least two helical gear wheels mounted on respective output shafts to rotate therewith, the helical gear wheels being disposed in meshing relationship with the rotatable members and the arrangement being such that in use rotation of the input shaft causes the rotatable members to circulate in a planetary path thereby rotating each of the helical gear wheels.

BRIEF DESCRIPTION OF THE DRAWINGS

Embodiments of the present invention will now be more particularly described with reference to the single figure of the accompanying drawings, which shows a roller worm gear arrangement embodying the present invention.

DESCRIPTION OF THE PREFERRED EMBODIMENT

The drawing represents in diagrammatical form a roller worm gear embodying the invention in axial section along the shafts of two helical gear wheels 1 and 2. The helical gear wheels 1 and 2, co-operate, via a ring of rolling bodies in the form of balls 3, which are maintained exactly at equal spacings from one another by a cage 4, which rotates on an input drive shaft 5. The input drive shaft is provided with a bearing track 6 for the ring of balls. The balls 3 rotating with the drive shaft 5 in the bearing groove 6 engage successively with threads 7 and 8 of the individual helical gear wheels 1 and 2 and bring about a rotary movement of the gear wheels 1 and 2 in dependence on the pitch of the threads 7 and 8. The axle bearings 13 and 12 of the wheels 1 and 2 are attached to output shafts 9 and 10, respectively. The gear wheels 1 and 2 therefore rotate integrally with their respective shafts. The output shafts 9 and 10 are mounted concentrically.

The ring of balls 3 is arranged to mesh with both the helical gear wheels 1 and 2. The gear wheels 1 and 2 are arranged coaxially in such a way that their respective threads 7 and 8 adjoin one another direct from wheel to wheel. In the zone of the circular path of the balls 3 which is remote from the common axle of the helical wheels 1 and 2 the balls 3 pass through a zone of 90° out of contact with the threads 7 and 8. In this zone, the balls 3 are guided without load in a guide groove of a stationary part 11 of the housing. The angle subtended by the circular planetary path of the balls 3 whilst they are in mesh with the threads 7 and 8 is an angle of arc of 270°, and this angle is divided equally into two portions, each of 135° for the wheels 1 and 2, respectively. Geometrical considerations dictate that the individual angles of arc for the threads 7 and 8 must be equal to, or a multiple of, the pitch angle of the ring of balls 3. In the embodiment shown in the drawing, the pitch angle of the balls 3 amounts to 45°. Other angular distributions for the helical wheels are possible, and they depend in the main on the purpose for which the gear is to be used, especially on the load to be borne by the individual helical wheels. The gear wheels may not only have threads on the circumference of the respective wheels, but also on the end faces of the respective wheels. As in the case of the example shown in the drawing, the threads 7 and 8 may be arranged obliquely on the gear wheels 1 and 2. In one embodiment, which comprises two helical gear wheels with threads arranged on the respective end faces and with the beginning and end of these threads in the same plane, the balls, rollers or the like pass through a load-free zone between the two wheels. In the last mentioned embodiment, unlike the embodiment illustrated in the drawing but still falling within the scope of the invention, the threads on the respective gear wheels do no adjoin one another from wheel to wheel. The space between the two helical gear wheels 1 and 2 of the example shown in the drawing is used for bringing out the input drive shaft 5. If the bearing points in the gearbox are suitably designed and if the diameter of the ring of balls 3 is of adequate dimensions, the input drive shaft 5 on either side of its central section which is provided with the track 6 may be mounted inside the zone between the two helical wheels 1 and 2 so that only the ends of the input drive shaft 5 project out of this zone. A large angle of arc for the load-free zone of the balls 3 on the side remote from the axles of the helical wheels allows a suitably large-dimensioned input shaft to be accommodated.

The helical gear wheels 1 and 2 may be so arranged as to move at different rotation speeds and also in different directions of rotation, by providing different individual transmission ratios between the respective gear wheels and the common input drive shaft 5. In order to obtain different directions of rotation of the helical gear wheels 1 and 2 whilst the input shaft 5 rotates in the same direction, it is necessary to arrange for the direction of the pitch of the threads 7 and 8 on the respective gear wheels 1 and 2 to alternate. Such a roller worm gear arrangement embodying the present invention is provided with more than one driven output shaft in a coaxial arrangement and different transmission ratios may be provided between each output shaft and a common input shaft. For example, three or four or more helical gear wheels may be provided in the gear arrangement with different rotational speeds and directions of rotation. The provision of a plurality of output shafts which, when the roller gear arrangement is in operation, rotate at different speeds necessitates the provision of different-sized pitches for the threads on the respective gear wheels, and the provision of different numbers of threads on the respective gear wheels.

In another embodiment of the invention, the helical gear wheels 1 and 2 are arranged to rotate synchronously. The helical gear wheels may then be joined together to form a block which rotates integrally with a common driven output shaft. This latter embodiment provides a roller worm gear arrangement which is of high power density and which is capable of taking a particularly high load. For a given distance between the centers of the input drive shaft 5 and the interlocked helical gear wheels 1 and 2 and with a given number of balls 3, it is possible for the load-carrying capacity of a roller worm gear arrangement embodying the invention to be approximately twice that of a roller worm gear arrangement of a previously known construction and of the same dimensions.

I claim:
1. A roller worm gear arrangement comprising in combination:
   a rotatable input shaft,
   a carrier disposed concentrically of said input shaft,
   a plurality of rotatable members carried at equal spacings around said carrier and in tangential contact with said input shaft,
   a plurality of co-axial output shafts transversely oriented with respect to said input shaft and at least two helical gear wheels each mounted on a respective output shaft to rotate therewith, said helical gear wheels being disposed in meshing relationship with said rotatable members, whereby, in operation, rotation of said input shaft causes said rotatable members to circulate in a planetary path thereby rotating each of said helical gear wheels.

2. An arrangement as defined in claim 1, wherein an arc of said planetary path in which said rotatable members are out of mesh with said helical gear wheels subtends an angle of at least 90° at the center of said planetary path.

3. An arrangement as defined in claim 1, wherein said plurality of co-axial helical gear wheels are mounted adjacent one another, the helical gears on adjacent ones of said helical gear wheels adjoining one another.

4. An arrangement as defined in claim 1, wherein the pitch of the helical gears on at least two of said helical gear wheels differ from one another, whereby the transmission ratio between the respective helical gear wheels and the input shaft differ from one another.

5. An arrangement as defined in claim 1, wherein the helical gears on respective ones of at least two of said helical gear wheels are oppositely inclined to one another, whereby in use said two helical gear wheels rotate in mutually opposite directions.

6. An arrangement as defined in claim 1, wherein said plurality of helical gear wheels comprises only two helical gear wheels mounted adjacent one another on respective ones of said co-axial shafts.

7. An arrangement as defined in claim 1, wherein each of said rotatable members comprises a substantially spherical ball.

8. An arrangement as defined in claim 1, wherein each of said rotatable members comprises a roller.

References Cited
UNITED STATES PATENTS

| | | | |
|---|---|---|---|
| 2,520,784 | 8/1950 | Schlicksupp | 74—458 |
| 3,535,948 | 10/1970 | Winzeler et al. | 74—425 X |
| 2,714,315 | 8/1955 | Reader et al. | 74—458 X |
| 3,190,138 | 6/1965 | MacChesney | 74—425 |
| 3,449,971 | 6/1969 | Posh | 74—425 X |
| 3,468,179 | 9/1969 | Sedgwick et al. | 74—425 |

ARTHUR T. McKEON, Primary Examiner

U.S. Cl. X.R.

74—459, 425